United States Patent

Nakano et al.

[11] 3,956,169
[45] May 11, 1976

[54] NEMATIC LIQUID CRYSTAL COMPOSITION

[75] Inventors: Fumio Nakano; Kazuhisa Toriyama; Noboru Nagata; Mikio Sato, all of Hitachi, Japan

[73] Assignee: Hitachi, Ltd., Japan

[22] Filed: Feb. 21, 1974

[21] Appl. No.: 444,532

[30] Foreign Application Priority Data
Feb. 23, 1973 Japan.................. 48-21222

[52] U.S. Cl.................. 252/299; 23/230 LC; 252/408; 350/160 LC
[51] Int. Cl.$^2$.............. C09K 3/34; G02F 1/13; G02F 1/16
[58] Field of Search........... 252/299, 408; 350/160 LC; 23/230 LC

[56] References Cited
UNITED STATES PATENTS

| | | | |
|---|---|---|---|
| 3,499,112 | 3/1970 | Heilmeier et al. | 252/299 |
| 3,656,834 | 4/1972 | Haller et al. | 252/408 |
| 3,680,950 | 8/1972 | Haas et al. | 252/299 |
| 3,697,150 | 10/1972 | Wysochi | 252/299 |
| 3,703,331 | 11/1972 | Goldmacher et al. | 252/299 |
| 3,716,289 | 2/1973 | Creagh et al. | 252/299 |
| 3,779,751 | 12/1973 | Haas et al. | 252/408 |
| 3,781,088 | 12/1973 | Tsukamoto et al. | 252/408 |
| 3,803,050 | 4/1974 | Haas et al. | 252/408 |
| 3,819,531 | 6/1975 | Saeva et al. | 252/408 |
| 3,838,059 | 9/1974 | Wong | 252/299 |
| 3,888,566 | 6/1975 | Toriyama et al. | 252/299 X |

Primary Examiner—Benjamin R. Padgett
Assistant Examiner—T. S. Gron
Attorney, Agent, or Firm—Craig & Antonelli

[57] ABSTRACT

A nematic liquid crystal composition having an improved responsibility to a pulsating driving voltage and a prolonged descent time of dynamic scattering mode which comprises a predominant amount of a nematic liquid crystal having properties of dynamic scattering mode, 0.1 to 1 % by weight of a cholesteric compound and 0.01 to 5 % by weight of a halide of an organic quaternary nitrogen compound.

18 Claims, 14 Drawing Figures

FIG. 7a (a) 6.0V APPLIED

FIG. 7b (b) 7.5V APPLIED

FIG. 7c (c) 9.0V APPLIED

FIG. 8a  (a) 5.5V APPLIED

FIG. 8b  (b) 6.0V APPLIED

FIG. 8c  (c) 8.4V APPLIED

NEMATIC LIQUID CRYSTAL COMPOSITION

This invention relates to a nematic liquid crystal composition having such characteristics as an improved responsibility to driving voltage, and a prolonged descent time of dynamic scattering mode, and more particularly to a nematic liquid crystal composition suitable for a matrix liquid crystal display device based on a time-sharing or multiplexing driving system.

Low consumption power and low voltage actuation of liquid crystals have been regarded as highly important, and the liquid crystals are going to be practically utilized as display devices for table-type electronic computers, watches, etc. For the expansion of their application fields, it is necessary to carry out the matrix display on the basis of multiplexing driving system. In that case, an increase in responsibility and prevention of cross-talks due to matrix address are important tasks.

To solve these tasks, several attempts have been so far made, for example, by electrically orienting the liquid crystals in one direction by a combination of non-linear elements such as diode, FET, etc. [B. J. Lechner : Liquid Crystal Matrix Displays, Proc. IEEE 59 (1971) 1566] or by making threshold values definite by laminating the liquid crystals with a highly dielectric material [J. G. Grahmaier et al.: Liquid crystal matrix displays using additional solid layers for suppression of parasite current, Mod. Liq. Cryst. 15 (1971) 95]. Furthermore, a two-frequency driving system has been proposed, where low frequency signals are applied to selected points, and high frequency signals to semi-selected points [C. R. Stein et al.: A two-frequency coincidence addressing scheme for nematic liquid crystal display, Appl. Phys. Letters, 19 (1971) 343]. It has been pointed that these prior arts are not satisfactory in contrast and driving voltage. On the other hand, Kawakami et al. disclosed that the multiplexing driving could be carried out at a low voltage with a high contrast but no cross-talks by a practical alternating current driving system, that is, the so-called voltage-averaging method [A multiplexing driving system for a liquid crystal device, Materials for the research conference on image display system, Television Institute, 11-2 (1973)]. It is necessary that the liquid crystals used in the system shows a sharp threshold value, and the theshold value should be as low as possible.

It is necessary that the liquid crystal compositions, which can undergo the multiplexing driving, have such a characteristic that they can be driven at a low voltage with a short pulse width. Molecular orientation of nematic liquid crystals is gradually disturbed by repeatedly applying to the nematic liquid crystals a voltage with a shorter pulse width than the time at which the molecular orientation starts to be disturbed by the applied electric field, that is, the so called rise time, at constant periodic intervals. By utilizing such an accumulative phenomenon of the liquid crystal towards the electric field, the multiplexing driving can be carried out. That is, the multiplexing driving of matrix type elements having many displayable numbers of lines can be carried out thereby. The displayable number of lines is proportionate to the applied voltage. Generally, the applied voltage must be elevated to increase the displayable number of lines. Furthermore, the rise voltage for the multiplexing driving based on such accumulative phenomenon is inevitably elevated, as compared with the rise voltage for the normal driving based on the application of voltage with normal, sufficiently long pulse width. It is obvious from these facts that, if the rise voltage can be lowered, the multiplexing driving at a low driving voltage and matrix display with increased number of lines can be carried out.

Furthermore, if the descent time can be made sufficiently longer than the rise time, said accumulative phenomenon is more liable to appear, and the rise voltage and the driving voltage can be lowered.

It is known that the descent time of dynamic scattering mode (DSM) of liquid crystals can be made longer by mixing a nematic liquid crystals with a cholesteric compound. G. H. Heilmeir et al reported memory effects by memory function of said mixed liquid crystal system [A new electric field-controlled reflective optical storage effect in mixed liquid crystal systems, Appl. Phys. Letters 13 (1968) 132]. That is, the reported phenomenon is such that a white, turbid state appears when a low frequency electric field of less than 100 Hz is applied to a mixture of a nematic liquid crystal, APAP (anisylidene-p-aminophenyl acetate) and a cholesteric liquid crystal (cholesteryl nonanoate) in a ratio of 9:1 by weight, and the white, turbid state continues even after the removal of the electric field. However, the phenomenon has such disadvantages that the contrast is poorer and the response is slower than DSM.

As to the memory effect, several other reports are available [W. Haas et al.: ac-Field-induced Grandjean plane texture on mixtures of room-temperature-nematics and cholesterics, Phys. Rev. Letters, 24 (1970) 577; J. P. Hulin: Parametric study of the optical storage effect in mixed liquid-crystal systems, Appl. Phys. Letters, 21 (1972) 955; R. E. Aldrich et al.: Design considerations of liquid crystal display, IEEE conference record of 1972, IEEE conference on display devices, Oct. 11-12 (1972) 151].

Aldrich et al. disclosed trials of matrix display, where the time of maintaining memorizability and the time of cancelling the memorizability were adjusted by changing the amount of a cholesteric liquid crystal to realize a flickering-free matrix display. However, in that case, the driving voltage was high, and scanning of only about ten lines was attained. According to their report, the most preferable amount of the cholesteric liquid crystal to be added was 2 % by weight.

An object of the present invention is to provide a liquid crystal composition having a good responsibility to the driving voltage, and a short rise time and a long descent time.

Another object of the present invention is to provide a liquid crystal composition having a sharp DSM threshold value, whereby the multiplexing drive of a practical matrix display device can be provided.

The present invention relates to a liquid crystal composition containing $N_n$-type nematic liquid crystals capable of effecting DSM, and a small amount of a cholesteric compound.

The above objects and other objects as well as the characteristics of the present invention will be apparent from the following detailed description by way of the accompanying drawings.

The nematic liquid crystals used in the present invention are liquid crystal compounds having a negative dielectric anisotropy, which are capable of effecting dynamic scattering, that is, the so-called $N_n$-type liquid crystal compounds in which the direction of dipole moment of the molecule is considerably deviated from the direction of longitudinal axis of the molecule. Since the display device is used in the ordinary circumstances, it is necessary that the liquid crystal temperature lies within a considerably broad range around the room temperature. The liquid crystal compounds include, for example, p-methoxybenzylidene-p-n-butylaniline (MBBA), p-ethoxybenzylidene-p-butylaniline (EBBA), p-butoxybenzylidene-p-butylaniline, p-butoxybenzylidene-p-n-propylaniline, p-hexyloxybenzylidene-p-toluidine, p-pentyloxybenzylidene-p-toluidine, p-heptyloxybenzylidene-p-acetoxyaniline, 4-methoxy-4'-butylazoxybenzene, 4-butyl-4'-methoxyazoxybenzene, ethoxybenzylidene-p-n-hexylaniline (EBHA), etc.

Generally, a single liquid crystal compound has a high liquid crystal temperature or a narrow-range of liquid crystal temperature. For example, a range of MBBA liquid crystal temperature is +21°C to +45°C, that of EBBA liquid crystal temperature is +36°C to +78°C, and that of EBHA liquid crystal temerautre is +37°C to +76°C. Usually, a liquid crystal temperature is lowered by mixing two or more of these liquid crystal compounds. For example, a range of liquid crystal temperature is −15°C to +50°C for a 50 : 50 (ratio by weight) mixture of MBBA and EBBA and +10°C to +47°C for a 80 : 20 mixture thereof, −10°C to +56°C for a 50 : 45 : 5 (ratio by weight) mixture of MBBA, EBBA and methylbenzylidene-butylaniline, −10°C to +48°C for a 60 : 40 (ratio by weight) mixture of MBBA and EBBA, and −8°C to +75°C for a 50 : 50 mixture thereof.

To the liquid crystal compound or composition is added 0.1 to 1 % by weight of a cholesteric compound on the basis of the weight of said nematic liquid crystal compound. The cholesteric compounds usable in the present invention must have an optical rotary power, so that the light scattering intensity is increased. Stronger the optical rotary power, the higher the light scattering intensity will become. Many cholesteric compounds having the above characteristics are known, for example, cholesterol, cholesterine, cholesteryl chloride, cholesteryl palmitate, cholesteryl stearate, cholesteryl nonanoate, etc.

If the amount of the cholesteric compound is less than 0.1 % by weight, any satisfactory effect cannot be obtained. If the amount is more than 1 % by weight, a white, turbid state is retained even after the removal of applied voltage owing to the dynamic scattering. That is, the so called memorizability appears. To cancel the white, turbid state, another means must be provided for applying a high frequency voltage to the display device. It has been confirmed that a good effect can be obtained particularly when 0.2 to 0.6 % by weight of the cholesteric compound is contained in the liquid crystal composition.

According to the present invention, 0.01 to 5 % by weight of a halide of organic quaternary nitrogen compound having a molecular weight of 110 to 2,100 is added to said mixed nematic and cholesteric liquid crystals as an ionic substance, based on the weight of the nematic liquid crystal compound. The halides include quaternary ammonium halides, pyridinium halides, isoquinolinium halides, and acridinium halides. For example, the ammonium halides include hexadecyltrimethylammonium bromide, ethylhexadecyldimethylammonium bromide, phenylbenzyldimethylammonium chloride, phenyltrimethylammonium bromide, phenyltrimethylammonium triiodide, 4-n-butylphenyltrimethylammonium triiodide, hexadecyltrimethylammonium triiodide, tetramethylammonium dichloroiodide, tetramethylammonium diiodide bromide, tetramethylammonium tetraiodide chloride, tetramethylammonium tetraiodide, etc.

The pyridinium halides include 1-hexadecylpyridinium chloride, 1-hexadecylpyridinium bromide, 1,1'-ethylenebispyridinium bromide, 1-hexadecylpyridinium triiodide, 1-dodecylpyridinium triiodide, 1-methylpyridinium triiodide, etc.

The isoquinolinium halides include 2-hexadecylisoquionolinium triiodide, 2-methylisoquinolinium triiodide, etc.

The acridinium halides include 10-methylacridinium chloride, 10-methylacridinium bromide, 10-methylacridinium triiodide, etc.

The foregoing halides can be represented by the following general formulas.

1. Quaternary ammonium halides (their molecular weights are about 110 to 2,100, particularly not more than 1,200):

wherein $R_1$, $R_2$, $R_3$ and $R_4$ represent phenyl groups, or alkyl or aralkyl groups having not more than 20 carbon atoms, particularly not more than 9 carbon atoms, X halogen atoms selected from bromine, iodine and chlorine atoms, and $n$ is an integer of 1, 3 or 5.

2. Pyridinium halides (their molecular weights are about 130 to 1,350, particularly not more than 1,100):

wherein R represents a phenyl group, or alkyl or aralkyl group having not more than 20 carbon atoms, particularly not more than 9 carbon atoms, X halogen atoms selected from bromine, iodine and chlorine atoms, and $n$ an integer of 1, 3 or 5.

3. Isoquinolinium halides (their molecular weights are about 180 to 1,130, particularly not more than 900):

wherein R, X and $n$ have the same meanings as defined in the foregoing item 2).

4. Acrilidinium halides (their molecular weights are about 230 to 1,170, particularly not more than 940).

wherein R, X and $n$ have the same meanings as defined in the foregoing item 2).

When less than 0.01 % by weight of the halide of the organic quaternary nitrogen compound is added to the mixed liquid crystals, the halide acts insufficiently as an ion source, and has no effect upon the improvement of the responsibility. On the other hand, when more than 5 % by weight of the halide is added to the mixed liquid crystals, there are too much ions, and the resistance is decreased, whereby a power consumption is increased.

Occurrence of the accumulative phenomenon depends upon the kind of halides, and bromide compounds have been found more effective. Ammonium triiodide is distinguished from the mere ammonium halides. That is, ammonium triiodide is better in solubility in the liquid crystals and can bring about the accumulative phenominon more effectively. Particularly, in the case of ammonium halides and triiodide, addition of 0.1 to 1 % by weight of the halides or triiodide to the mixed cholesteric-nematic liquid crystals is effective. Any combination of said ionic substance with the cholesteric compounds or cholesterine derivatives can be selected freely, but a combination of mutually inert compounds can bring about a more preferable result.

Figure 1A:
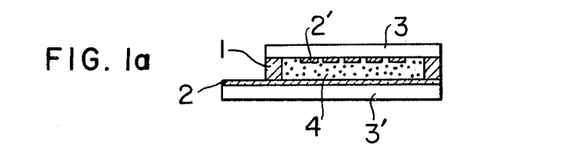
FIGS. 1a and 1b are a cross-sectional view and a plan view of a structure of liquid crystal element used for experiments, as described below, respectively.
Figure 1B:
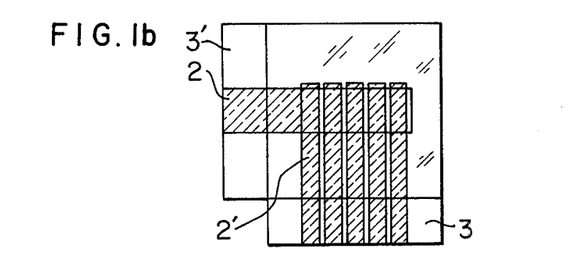
Figure 2:
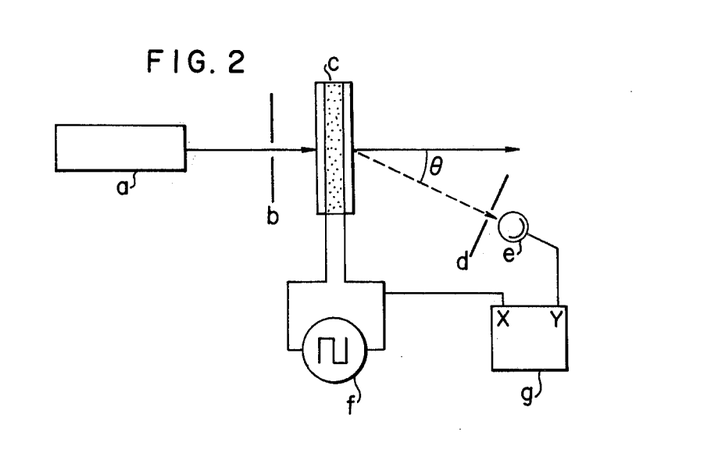
FIG. 2 is a schematical view of an apparatus used for measuring electric-optical characteristics of liquid crystal element shown in FIGS. 1a and 1b.
Figure 3:
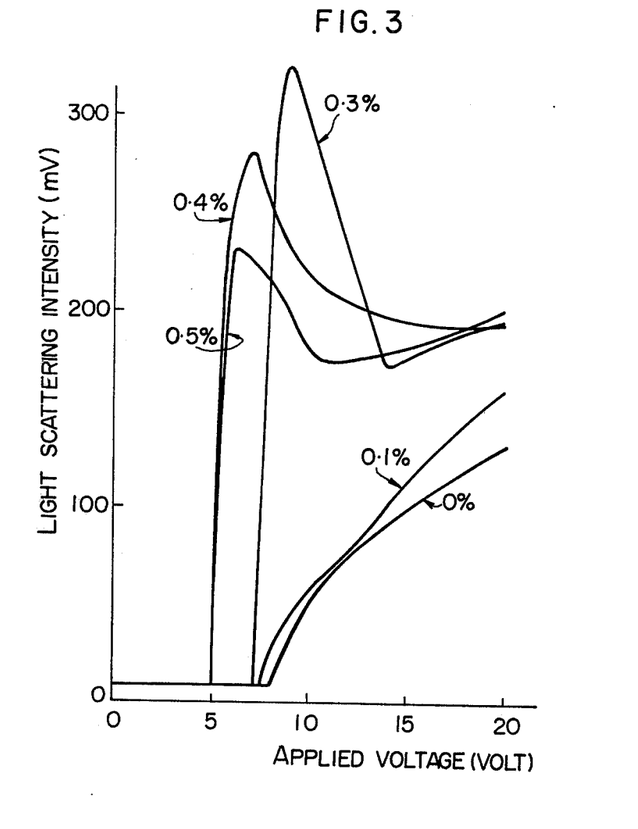
FIG. 3 is a graph showing relations between the applied voltages and light scattering intensities, obtained from the liquid crystal element using the liquid crystal composition of the present invention.

A transmission-type liquid crystal element as shown in FIGS. 1a and 1b was prepared, using liquid crystal compositions shown in Table 1, and light scattering intensities ($mV$) were measured by an apparatus for measuring electro-optical characteristics of FIG. 2. The results are shown in FIG. 3. Total four liquid crystal compositions were prepared from the compounds shown in Table 1 by adding 0.1 % by weight of tetrabutylammonium bromide and 0.1 %, 0.3 %, 0.4 % or 0.5 % by weight of cholesteryl nonanoate (Ch. N) as a cholesteric compound to an equi-molar mixture of MBBA and EBBA, typical $N_n$-type liquid crystals. For comparison, a liquid crystal composition free from cholesteryl nonanoate is also shown in FIG. 3.

As shown in FIGS. 1a and 1b, a 10 micron-thick, liquid crystal layer 4 was inserted between glass plates 3,3' provided with transparent nesa films ($S_nO$ films) 2,2' and the liquid crystal layer 4 was sealed by providing spacers 1 between the glass plates 3,3'. Width of the nesa film 2 was 10 mm, and the width of counterposed electrodes 2' was 4 mm. An organic silicone compound was thinly coated onto the surfaces of the glass plates and nesa films, whereby the molecules of the liquid crystal compounds and cholesteric compounds were oriented homoeotropically towards the nesa films.

As shown in FIG. 2, an He — Ne laser $a$ was used as a light source, and a pinhole was made in a diaphragm $b$. A liquid crystal element C was hit by the laser light through the pinhole. The electrodes of the liquid crystal element were connected to a driving power source $f$, and the power source $f$ drived the liquid crystal element by multiplexing by means of signals from an X — Y recorder $g$. A power meter $e$ was located at a position, which was 30 cm distant from the element and deviated by 30° (= $\theta$) from the path of the laser light. A diaphragm $d$ was placed in that deviated path before the power meter $e$. The scattered light received by the power meter was transferred to the X — Y recorder $g$ as a voltage. The data thus obtained are shown in FIG. 3. The applied voltage (V) is plotted on the abscissa, and the light scattering intensity ($mV$) on the ordinate, and in FIG. 3 the percentage (%) represents the amount of cholesteryl nonanoate added. The driving voltage was an AC voltage of rectangular wave at a frequency of 100 Hz. It is seen from FIG. 3 that, when more than 0.3 % by weight of cholesteryl nonanoate was added to the liquid crystals, the rise of the scattering intensity from the threshold value was very sharp.

Table 1

| Nematic liquid crystal compounds | Parametho­xybenzylidene parabutyl­aniline (MBBA) |
|---|---|
| |  |
| | Paraethoxybenzylidene parabutyl­aniline (EBBA) |
| |  |
| Cholesteric compound | Cholesteryl nonanoate (Ch. N) |
| |  |
| Ionic substance | Tetrabutylammonium bromide $(C_4H_9)_4N^+B_4^-$ |

When no cholesteryl nonanoate was added to the liquid crystals, the threshold value was 8 V and the scattering intensity was saturated at about 20 V. On the other hand, when 0.3 % by weight of cholesteryl nonanoate was added to the liquid crystals, the threshold value was 7.5 V, and the saturation value was 8.5 V. The saturation value of the scattering intensity was about three times as high as that when no cholesteryl nonanoate was added. That is, an element having a high contrast can be obtained. More conveniently, the threshold value was lowered to about 5 V, when 0.4 % or 0.5 % by weight of cholesteryl nonanoate was added to the liquid crystals. Further, the light scattering intensity showed a maximum value right over the threshold value. Such peculiar phenomena were not seen in the conventional DSM. None of such phenomena was observed in the liquid crystal composition free from the ionic substance. Therefore, it can be presumed that both ionic substance and cholesteric compound take part in such phenomena.

Figure 4A:
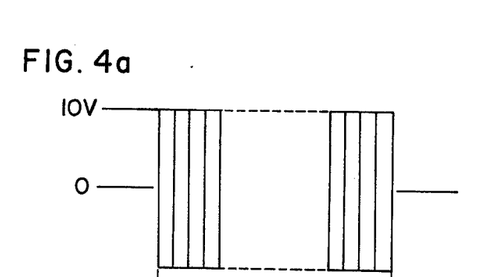
FIGS. 4a and 4b are drawings for explaining a definition of response time of the liquid crystal composition.
Figure 4B:
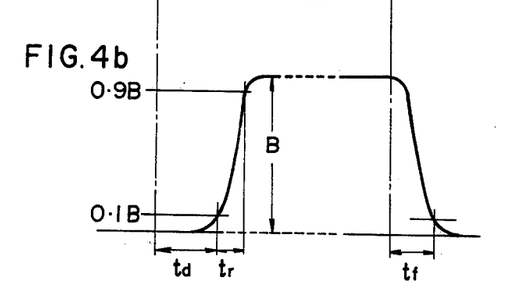

It was presumed that, when the cholesteric liquid crystal was mixed with the nematic liquid crystal, a responsibility, especially rise characteristic would be deteriorated, but the actually obtained results were contrary to the presumption, as shown in Table 2. The response time of Table 2 was measured for the liquid crystal elements used in the foregoing experiment, and the definition of the response time is shown in FIGS. 4a and 4b. FIG. 4a shows a wave form of the applied voltage, and FIG. 4b shows a wave form of light scattering response, where B stands for full "brightness".

Table 2

|  | No Ch.N. added | 0.5% Ch.N. added |
|---|---|---|
| Rise delay time, td (ms) | 118 | 95 |
| Rise time, tr (ms) | 53 | 43 |
| Descent time, tf (ms) | 23 | 55 |

The driving power source was 10 AC of rectangular form at a frequency of 100 Hz, and measurement was carried out at 30°C. The results of Table 2 reveal that both rise delay time and rise time are shorter but the descent time is longer with addition of 0.5 % cholesteryl nonanoate than with no addition of cholesteryl nonanoate. Therefore, the addition of cholesteryl nonanoate is effective for eliminating flickering, which tends to appear in the multiplexing driving of a matrix display.

Figure 7A:
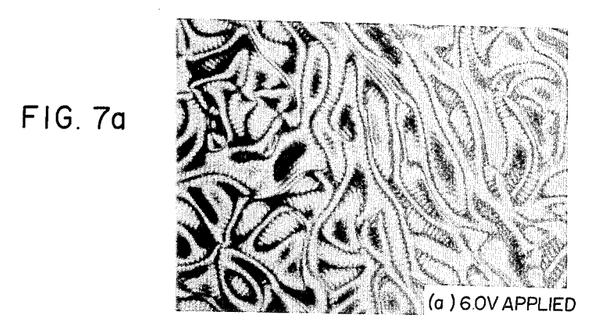
FIGS. 7a, 7b and 7c are pictures showing changes in pattern over the theshold values of the liquid crystal compositions of comparision purpose, which were observed by a polarizing microscope.
Figure 7B:
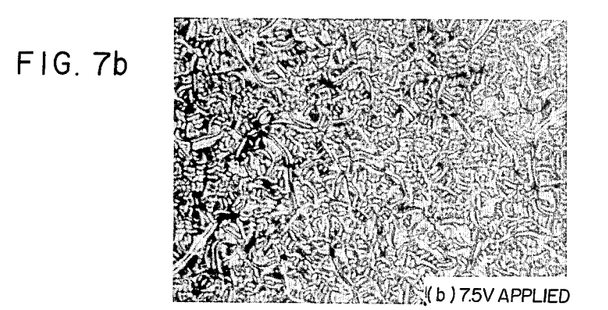
Figure 7C:
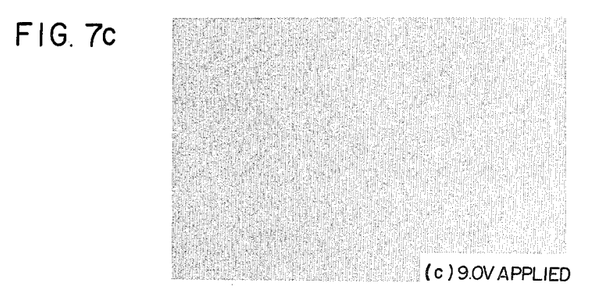
Figure 8A:
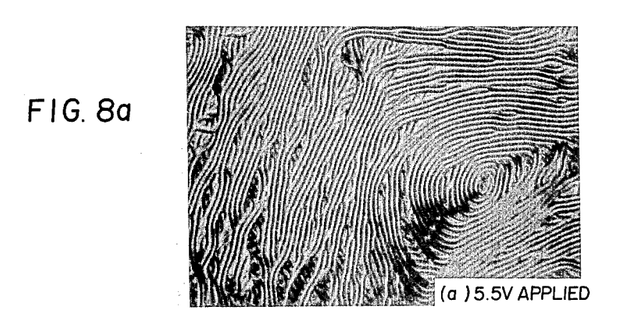
FIGS. 8a, 8b and 8c are pictures showing changes in pattern of the liquid crystal compositions of the present invention.
Figure 8B:
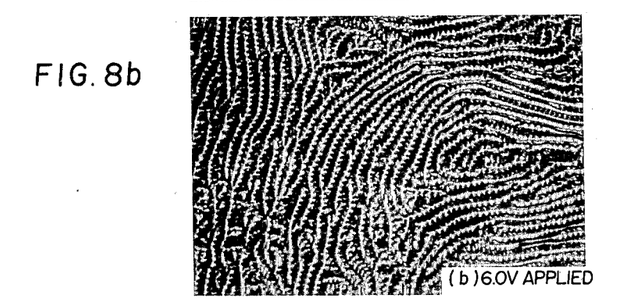
Figure 8C:
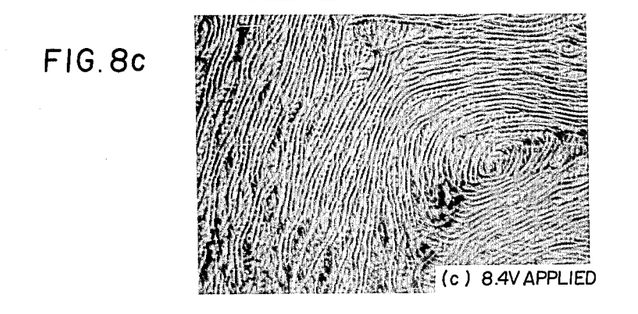

It is seen from the foregoing description that the liquid crystal composition of the present invention has a remarkably different light scattering mechanism from that of the conventional DSM. The remarkable difference was confirmed in the patterns of light scattering of the liquid crystal compositions used in the foregoing experiment, when observed by a polarizing microscope, as shown in FIGS. 7a, 7b and 7c, and FIGS. 8a, 8b, and 8c, where magnification was 200 × ¾, and an AC voltage of rectangular form at a frequency of 100 Hz was applied. FIGS. 7a, 7b, and 7c show changes in pattern of the liquid crystal compositions free from cholesteryl nonanoate by the applied voltage, and FIGS. 8a, 8b and 8c show changes in patterns of the liquid crystal compositions containing 0.5 % by weight of cholesteryl nonanoate. All of the changes appeared over the threshold value. In FIGS. 7a, 7b, and 7c, typical DSM patterns are shown. At a voltage lower than the threshold voltage, a domain pattern, which can be presumed as a William domain, as shown in FIG. 7a, appeared, and with a further increase in the voltage, disturbance appeared, as shown in FIGS. 7b and 7c, whereby the domain was made finer.

On the other hand, in the case of the nematic cholesteric mixed crystals, a domain pattern with regularly arranged, parallel stripes, as shown in FIG. 8a could be observed at a voltage just over the thereshold value. The pattern was fixed, and even with an increase the voltage, the original parallel pattern was maintained, though a little deformed, as shown in FIGS. 8b and 8c, and no disturbance as seen in the case of DSM was observed.

It can be presumed that the parallel stripe pattern of the nematic-cholesteric mixed liquid crystal is due to the essentially same cellular movement as that of the William domain, but cholesteric structures are locally formed in the liquid crystal layer, whereby the movement of ion flow is controlled and a fixed pattern is developed. Thus, it can be presumed that a combination of the special pattern and the formation of local cholesteric structure will bring about strong light scattering.

Now, the present invention will be explained in detail by way of further embodiments of the present invention. Table 3 shows rise voltages and voltages at which the light scattering is saturated, for compositions of the present invention, when an AC voltage of rectangular form with a pulse width of 2 ms and a duty ratio of ⅛ was applied thereto, in comparison with the compositions free from the cholesteric compound (Comparative Examples 1 to 3).

Table 3

| | Composition | Rise voltage | Saturation voltage |
|---|---|---|---|
| Comp. Ex. 1 | VL-1047N (trade mark of methoxybenzylidene-p-n-butylaniline made by Varilite Co.) | 40V or more | 40V or more |
| Comp. Ex. 2 | VL-1047N mixed with 0.5 % by weight of cholesteryl palmitate | 40V or more | 40V or more |
| Comp. Ex. 3 | VL-1047N mixed with 0.2 % by weight of hexadecyl-trimethylammonium bromide | 24V | 28V |
| Ex. 1 | VL-1047N mixed with 0.5 % by weight of cholesteryl palmitate and 0.2 % by weight of hexadecyltri-methylammonium bromide | 18V | 20V |
| Ex. 2 | NP-V* (trade mark of azoxy liquid crystal made by Merk Co.) mixed with 0.2 % by weight of cholesteryl chloride and 0.2 % by weight of hexadecyltrimethyl-ammonium bromide | 22V | 24V |
| Ex. 3 | NP-V mixed with 0.2 % by weight of cholesteryl chloride and 0.1 % by weight of trimethyl-n-butyl-ammonium triiodide | 17V | 20V |
| Ex. 4 | A mixture in equal weights of methoxybenzylidene-p-n-butylaniline and ethoxy-benzylidene-p-n-butyl-aniline, mixed with 0.2 % by weight of cholesterine and 0.2 % by weight of 1-hexadecylpyridinium bromide | 15V | 17V |

*NP-V is eutectic mixture of the following nematic liquid crystal compounds:

As is apparent from Table 3, the compositions of the present invention (Examples 1 to 4) have a low rise voltage and a low saturation voltage, and can assure a low voltage driving.

Figure 5:
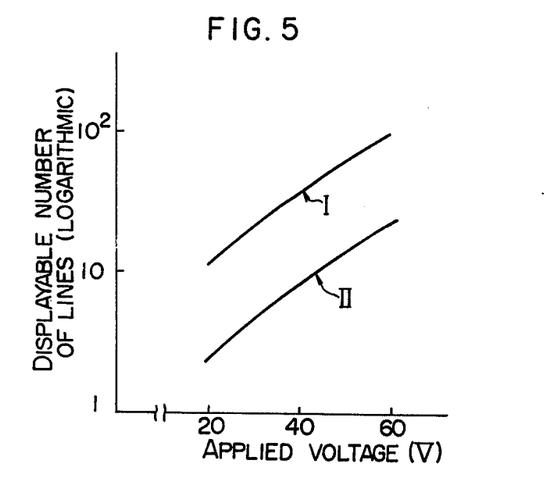
FIG. 5 is a graph showing relations between the applied voltage and displaying number of lines for a matrix display device using the liquid crystal composition of the present invention, and that using the liquid crystal composition of comparative purpose.

Relations between displayable number of lines and applied voltage, when a matrix display device of 100 × 100 lines is to be displayed by successive scanning, are shown in FIG. 5. Curve I shows the case where the liquid crystal composition of Example 1 of Table 3 is used, and Curve II shows the case where the liquid crystal composition of Comparative Example 3 of Table 3 is used. The displayable number of lines of a matrix depends upon the rise voltage and the saturation voltage of the liquid crystal used. The lower these voltage values, the better the responsibility to the applied voltage. Furthermore, if the rise time is substantially long, the displayable number of lines can be increased without any flickering at the multiplexing driving of the matrix. As is apparent from FIG. 5, the displayable number of lines of the liquid crystal composition of the present invention is larger approximately by one order than that of the comparative liquid crystal composition. When display devices having equal displayable number of lines are to be prepared, an applied voltage of the display device can be lowered with the present composition to one-half of the applied voltage of the display device using the comparative composition.

Figure 6:
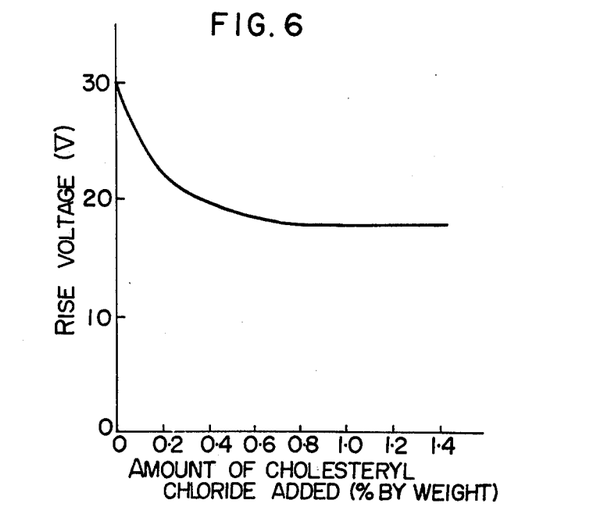
FIG. 6 is a graph showing relations between the amount of cholesteryl chloride contained in the liquid crystal composition of the present invention, and the rise voltages.

Changes in the rise voltage of the liquid crystal composition of Example 2 of Table 3 are shown in FIG. 6 with a pulse width of 2 ms and repeated period of 16 ms (duty ratio: ⅛) by changing the amount of cholesteryl chloride to be added. The rise voltage is lowered with an increase in the amount of cholesteryl chloride up to about 1 % by weight, and is kept constant thereafter.

As described above in detail, the display device using the present liquid crystal composition can undergo multiplexing driving at a low voltage, and can readily attain a large scale matrix display having more displayable lines.

The liquid crystal composition of the present invention can be applied not only to the liquid crystal display device based on the multiplexing driving system, but also to a display device based on dynamic scattering, a light intensity-adjusting device, electro-optical light shutter, etc.

What is claimed is:

1. A dynamic scattertype nematic liquid crystal composition, which comprises a predominant amount of a nematic liquid crystal selected from the group consisting of an $N_n$-type nematic liquid crystal having a Schiff base type structure within the molecule and an $N_n$-type liquid crystal having an azoxy structure within the molecule, 0.1 to 1% by weight of a cholesteric compound of optical rotary power, and 0.01 to 5% by weight of a halide of an organic quaternary nitrogen compound having a molecular weight of 110 to 2,100, based on the weight of the nematic liquid crystal.

2. A nematic liquid crystal composition according to claim 1, wherein the amount of the cholesteric compound is 0.2 to 0.6 % by weight.

3. A nematic liquid crystal composition according to claim 1, wherein the amount of said halide of an organic quaternary nitrogen compound is 0.1 to 1% by weight based on the weight of the nematic liquid crystal.

4. A nematic liquid crystal composition according to claim 1, wherein said halide of an organic quaternary nitrogen compound is at least one member selected from the group consisting of a quaternary ammonium halide, a pyridinium halide, an isoquinolinium halide, and an acridinium halide.

5. A nematic liquid crystal composition according to claim 1, wherein said halide of an organic nitrogen quaternary compound has a molecular weight of 110 to 1,200.

6. A nematic liquid crystal composition according to claim 4, wherein said halide of an organic quaternary nitrogen compound is a quaternary ammonium halide having the following general formula:

wherein $R_1$, $R_2$, $R_3$ and $R_4$ represent phenyl groups, or alkyl or aralkyl groups having not more than 20 carbon atoms, X represents bromine, iodine, chlorine or combinations thereof, and n is 1, 3 or 5.

7. A nematic liquid crystal composition according to claim 4, wherein the halide of the organic quaternary nitrogen compound is a pyridinium halide represented by the following general formula:

wherein R represents a phenyl group or alkyl or aralkyl group having not more than 20 carbon atoms, X represents bromine, iodine, chlorine, atoms or combination thereof and $n$ an integer of 1, 3 or 5.

8. A nematic liquid crystal composition according to claim 4, wherein the halide of the organic quaternary nitrogen compound is an isoquinolium halide represented by the general formula:

wherein R represents a phenyl group or alkyl or aralkyl group having not more than 20 carbon atoms, X represents bromine, iodine, chlorine and combinations thereof, and $n$ an integer of 1, 3 or 5.

9. A nematic liquid crystal composition according to claim 4, wherein the halide of the organic quaternary nitrogen compound is an acridimium halide, represented by the following general formula:

wherein R represents a phenyl group or alkyl or aralkyl group having not more than 20 carbon atoms, X represents bromine, iodine, chlorine atoms, or combinations thereof and $n$ an integer of 1, 3 or 5.

10. A nematic liquid crystal composition according to claim 1, wherein the cholesteric compound is selected from the group consisting of cholesterol, cholesterine, cholesteryl chloride, cholesteryl palmitate, cholesteryl stearate, and cholesteryl nonanoate.

11. A nematic liquid crystal composition according to claim 4, wherein said composition consists essentially of said nematic liquid crystal, said cholesteric compound and said halide of an organic quaternary nitrogen compound.

12. A nematic liquid crystal composition according to claim 11, wherein said composition consists of said nematic liquid crystal, said cholesteric compound and said halide of an organic quaternary nitrogen compound.

13. A nematic liquid crystal composition according to claim 11, wherein the amount of the cholesteric compound is 0.2 to 0.6% by weight.

14. A nematic liquid crystal composition according to claim 13, wherein the amount of said halide of an organic quaternary nitrogen compound is 0.1 to 1% by weight based on the weight of the nematic liquid crystal.

15. A nematic liquid crystal composition according to claim 11, wherein the amount of said halide of an organic quaternary nitrogen compound is 0.1 to 1% by weight based on the weight of the nematic liquid crystal.

16. A nematic liquid crystal composition according to claim 15, wherein said halide of an organic quaternary nitrogen compound is a quaternary ammonium halide.

17. A nematic liquid crystal composition according to claim 15, wherein said halide of an organic quaternary nitrogen compound is a triiodide.

18. A nematic liquid crystal composition according to claim 11 in which the components thereof are mutually inert.

* * * * *